May 31, 1927.

J. L. CRAWFORD 1,630,892

TANK BLOCK FOR GLASS FURNACES

Filed June 11, 1925

INVENTOR
James L. Crawford
BY
Pennie Davis Marvin & Edmonds
his ATTORNEYS

Patented May 31, 1927.

1,630,892

UNITED STATES PATENT OFFICE.

JAMES L. CRAWFORD, OF ST. LOUIS, MISSOURI, ASSIGNOR TO LACLEDE-CHRISTY CLAY PRODUCTS COMPANY, OF ST. LOUIS, MISSOURI, A CORPORATION OF MISSOURI.

TANK BLOCK FOR GLASS FURNACES.

Application filed June 11, 1925. Serial No. 36,331.

This invention relates to tank blocks for glass furnaces; in particular to a novel form of block especially designed to resist corrosion.

A large proportion of all glass manufactured is made in large tanks which are built of fire clay refractory blocks of various sizes. It is quite common to make the side walls of two courses of blocks, the total height of the wall being about 42 inches and its thickness 12 inches. The inner face of the walls which contacts with the molten glass is usually vertical. One of the most serious difficulties with which the glass manufacturer has to contend is the rapid corrosion of these so-called flux blocks by the action of the molten glass. It is the object of the present invention to design a block of such form that this corrosion shall be minimized or in any event retarded.

Figure 1:
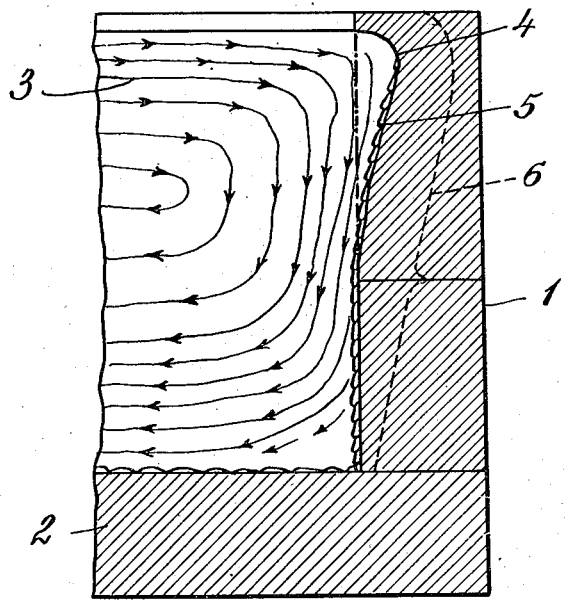
Figure 2:
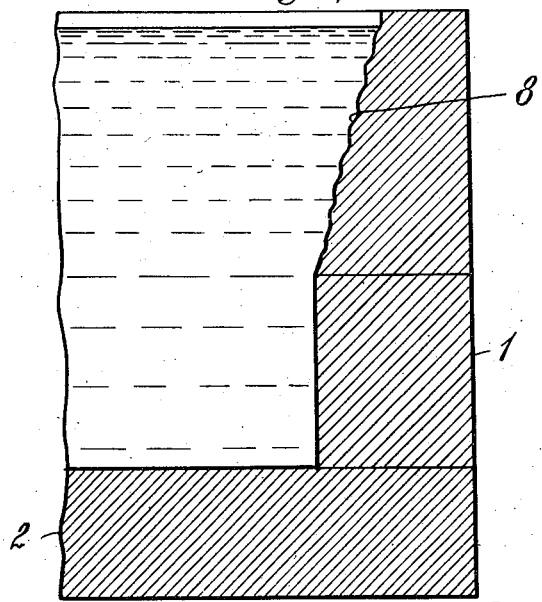

In Figure 1 of the accompanying drawings I have illustrated a fragmentary section through the side walls and bottom of a glass melting tank showing the manner in which the corrosion of the flux blocks takes place. In Figure 2 I have illustrated a similar section through a tank in which the blocks used in the upper courses of the side walls are made in accordance with the present invention.

I shall first describe the corrosion with special reference to Figure 1. In this figure, 1 represents the side wall of the tank made up of two courses of flux blocks, 2 the bottom of the tank, and 3 the molten glass. It has been noticed that the glass in the tank flows down along the side wall in the direction indicated by the arrows. This flow of the glass downward along the side wall and upward in the center of the tank has been attributed to differences in temperature or convection currents. It is believed that the corroding of the flux block is due to the flow of the glass against the face of the upper block at 4 where it attacks the refractory, becomes saturated with it and forms a heavier glass which passes down along the side wall and protects the lower part of the wall from corrosion. In a very short time a new tank will take the shape shown in Figure 1 by the line 5. Eventually the corrosion will go so far that the inner face of the side walls assumes the form and position indicated by the line 6.

In accordance with the present invention I make either part or all of the side wall with an inclined corrugated face as indicated at 7 in Figure 2. This retards the corrosion and greatly prolongs the life of the tank. My explanation of this is as follows: When the glass current strikes this inclined face and dissolves part of the refractory, the saturated glass is held in situ by the inclined face and this saturated glass protects the clay from further disintegration. By holding a protective coating of this saturated glass on the surface of the block I can greatly retard corrosion. I have discovered that the original smooth face of the block is much more resistant to corrosion than after the glass has eaten into it and roughened it. Therefore, by retarding the corrosion at its inception I make it doubly easy to prolong the life of the block.

In the tank illustrated in Figure 2, I have shown two courses of the flux block, only the upper of which is constructed in accordance with the present invention. It is well known that glass melting tanks are constructed with various numbers of courses and various depths and that as a rule the corrosion is most severe near the top of the tank wall. In the case of shallow tanks, it is quite possible, and perhaps desirable, to extend the inclined face to the bottom of the tank, while in deep tanks, or in tanks melting special glass, this inclined face may be extended only part way as shown.

I claim:

1. A block for glass melting tanks having an outwardly inclined corrugated face.

2. A refractory fire clay block for glass melting tanks having an outwardly inclined face designed to come in contact with the molten glass, said face being provided with horizontal corrugations designed to retard the removal of the saturation product of the glass and clay.

3. A glass melting tank comprising bottom and side walls of refractory material, the inner upper face of the side walls being inclined outwardly and provided with longitudinal corrugations which hold in situ the saturated product resulting from the action of the molten glass on the material of the block.

In testimony whereof I affix my signature.

JAMES L. CRAWFORD.